No. 689,117. Patented Dec. 17, 1901.
A. N. PETIT.
DUPLICATE SOUND RECORD CYLINDER FOR PHONOGRAPHS.
(Application filed Mar. 18, 1901.)
(No Model.)
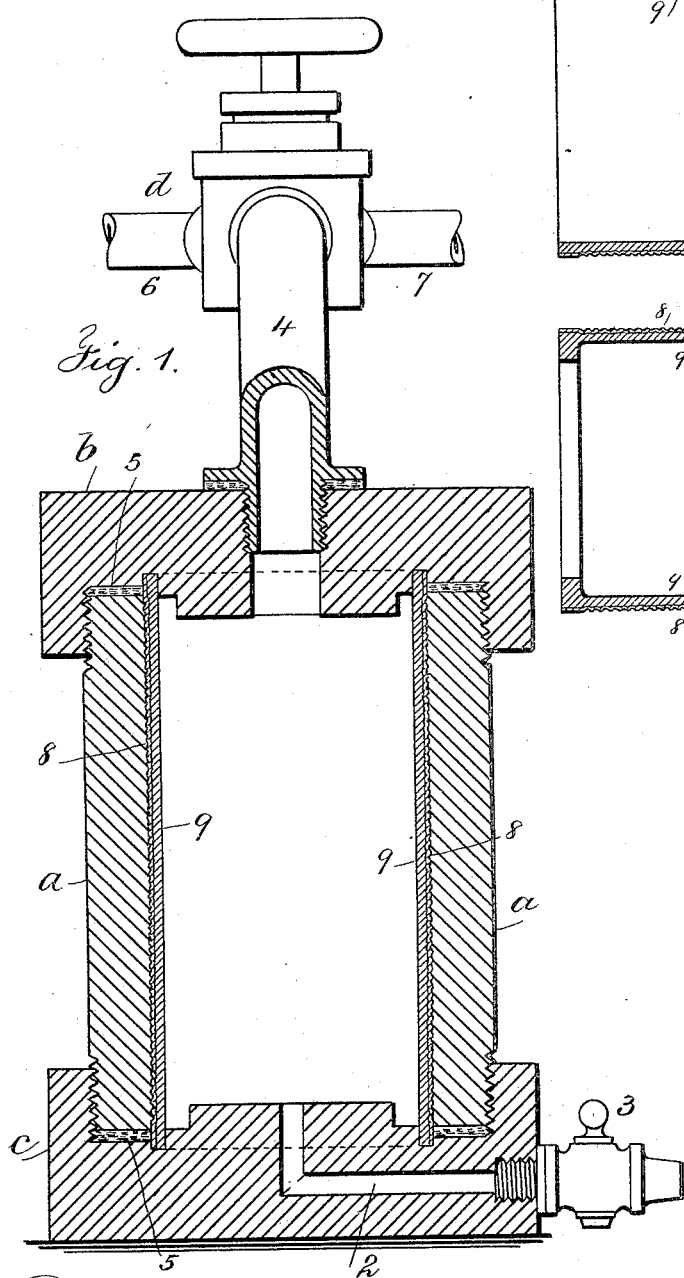
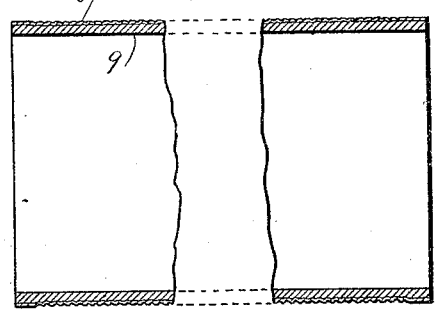
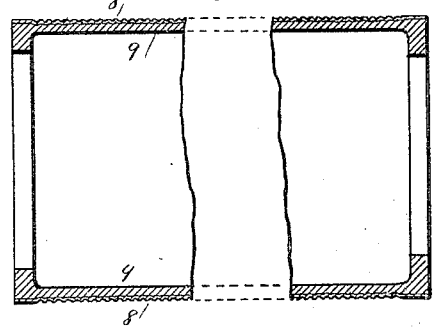
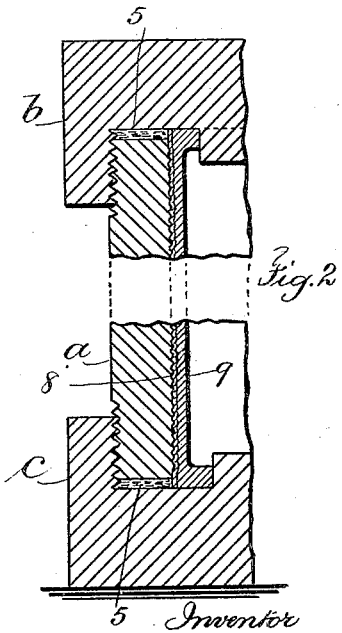
Witnesses
Chas H Smith
J. Staib
Inventor
Ademor N. Petit
per L. W. Serrell & Son
attys
THE NORRIS PETERS CO., PHOTO-LITHO., WASHINGTON, D. C.

UNITED STATES PATENT OFFICE.

ADEMOR N. PETIT, OF NEWARK, NEW JERSEY.

DUPLICATE SOUND-RECORD CYLINDER FOR PHONOGRAPHS.

SPECIFICATION forming part of Letters Patent No. 689,117, dated December 17, 1901.

Original application filed December 8, 1900, Serial No. 39,127. Divided and this application filed March 18, 1901. Serial No. 51,595. (No model.)

*To all whom it may concern:*

Be it known that I, ADEMOR N. PETIT, a citizen of the United States, residing at Newark, in the county of Essex and State of New Jersey, have invented an Improvement in Duplicate Sound-Record Cylinders for Phonographs and Similar Machines, of which the following is a specification.

My present application is a division of my application for Letters Patent filed December 8, 1900, Serial No. 39,127.

My invention relates to a new article of manufacture—that is, a duplicate sound-record cylinder for phonographs and similar machines, made in a matrix.

In carrying out my invention the duplicate sound-record is composed of a surface film or body of suitable material carrying a record of sound and a foundation of a different or inexpensive material connected thereto by cementing adhesion under heat and pressure. For this surface film I prefer to employ celluloid and for the foundation an inexpensive material of any desired character, such as celluloid loaded with pigment to give body and carrying a surface impregnation of a material of a solvent nature, such as amyl acetate, for the celluloid, the parts being connected together by cementing adhesion under heat and pressure. For this surface film I may also employ gelatin, lac, glue, gum, collodion, or similar material. For these materials there is one or more solvents, and the foundation carries a surface impregnation of a solvent, such as is employed for the surface film. Consequently when in the manufacture heat and pressure are employed the heat softens the foundation, as well as the surface film, and causes an action of the solvents of the film and foundation, which acting together with the heat and pressure have a cementing adhesion to permanently connect the surface film and the foundation.

The method of manufacturing this duplicate sound-record cylinder is set forth in my aforesaid application, and while I do not limit myself to the method employed for manufacturing the same the method employed in said application is the preferable one.

In the drawings, Figure 1 is a vertical section of an apparatus adapted for the manufacture of my duplicate sound-record cylinder and showing a cylinder with plain ends. Fig. 2 is a partial vertical section of the apparatus, showing the cylinder with inturned ends or flanges. Fig. 3 is a broken section of a cylinder such as is shown in the apparatus Fig. 1, and Fig. 4 a broken section of a cylinder such as is shown in the partial section of the apparatus Fig. 2.

The apparatus is described in an application of like date herewith, and while I prefer this form of apparatus I do not limit myself thereto. The improved apparatus in which this article of manufacture is made comprises a cylindrical matrix $a$, a head $b$, connected by a threaded flange to one end of the said matrix, and a base $c$, connected also by a threaded flange to the other end of the said matrix in a similar manner, there being packings 5 preferably between the ends of the matrix and the inner surface of the head and base, so as to secure a tight joint against steam and compressed air. The base $c$ is preferably provided with an exit-opening 2 and an escape-cock 3, and the head is preferably provided with a central opening, to which is connected a pipe 4, and a three-way cock $d$ is connected to the pipe 4, and from the opposite sides of this there are a steam-pipe 6 and a pipe 7 for compressed air.

8 represents the surface-film duplicate sound-record, and 9 the foundation or cylindrical shell. The apparatus is preferably made, as shown, with annular grooves to receive the ends of the foundation, with the object of insuring the steam and air pressure doing the work and preventing the same getting in between the foundation and skin. With the matrix separated and disconnected from the head and base the inner surface of the matrix is to be coated to any desired thickness by a material such as hereinbefore set forth and in a fluid state. This material may be applied by a brush or by centrifugal action, or both, so as to impart to the matrix-surface an even homogeneous film until the desired thickness is obtained, after which said film is preferably allowed to set or dry, so as to yield an impression of the matrix. The film thus obtained is firm, dense, and yet flexible. The foundation 9 or cylindrical shell should fit closely within the film thus formed upon the surface of the matrix, and this foundation may be made with integral inturned ends or flanges or not. Figs. 1 and 3 show the duplicate sound-record cylinder without inturned ends, while Figs. 2 and 4 show the foundation with inturned ends, and in the article I do not limit myself to the form of the ends. In the operation of manufacture and after the film is formed and the foundation placed within the same and the parts of the apparatus connected up, as shown in Fig. 1, steam is admitted within the matrix through the pipe 6, the three-way cock $d$, and the pipe 4, so as to soften the foundation and the surface film upon the matrix, and the steam being of pressure expands the foundation, bringing the same into intimate contact with the surface film, and the foundation and the film are united by the cementing adhesion of heat and pressure. This action is made all the more sure and positive where the surface of the foundation is impregnated with a solvent material of the same character as that employed in the surface film. After the heat has been maintained, together with the steam, a sufficient time the same is turned off at the three-way cock, and compressed air is admitted by the pipe 7, the escape-cock 3 being opened to drive out the steam until the compressed air entirely fills the space within the matrix, when the three-way cock is closed and the compressed air admitted of full force. The pressure of the compressed air is maintained within the matrix to hold the duplicate sound-record in shape until the same is thoroughly cooled and set, and this operation may be facilitated by the application of a cold or a cooling liquid to the exterior of the matrix or entire apparatus. This cooling action produces a slight shrinking in the duplicate sound-record cylinder, so that after the head or base is separated from the matrix the cylinder is readily removed therefrom.

I claim as my invention—

1. As a new article of manufacture, a duplicate sound-record cylinder composed of a surface film of suitable material carrying a record of sound and a foundation of a different and inexpensive material connected thereto by cementing adhesion under heat and pressure, substantially as set forth.

2. As a new article of manufacture, a duplicate sound-record cylinder composed of a surface film of celluloid carrying a record of sound and a foundation of inexpensive material carrying a surface impregnation of a material of a solvent nature connected thereto by cementing adhesion under heat and pressure, substantially as set forth.

3. As a new article of manufacture, a duplicate sound-record cylinder composed of a surface film of suitable material carrying a record of sound and a foundation of inexpensive material carrying a surface impregnation of the same solvent material as that employed for the surface film connected thereto by cementing adhesion under heat and pressure, substantially as set forth.

4. As a new article of manufacture, a duplicate sound-record cylinder composed of a surface film of suitable material and a foundation of a different and inexpensive material connected thereto by cementing adhesion under heat and pressure, substantially as set forth.

5. As a new article of manufacture, a duplicate sound-record cylinder composed of a surface film of celluloid and a foundation of inexpensive material carrying the surface impregnation of a material of a solvent nature connected thereto by cementing adhesion under heat and pressure, substantially as set forth.

6. As a new article of manufacture, a duplicate sound-record cylinder composed of a surface film of suitable material and a foundation of inexpensive material carrying a surface impregnation of the same solvent nature as that employed for the surface film connected thereto by cementing adhesion under heat and pressure, substantially as set forth.

Signed by me this 13th day of March, 1901.

ADEMOR N. PETIT.

Witnesses:
GEO. T. PINCKNEY,
S. T. HAVILAND.